United States Patent

Karino et al.

[11] Patent Number: 5,457,300
[45] Date of Patent: Oct. 10, 1995

[54] CONSUMABLE ELECTRODE DC ARC WELDER

[75] Inventors: Kunio Karino, Suita; Haruo Moriguchi, Itami; Toshikazu Fujiyoshi, Kawanishi; Kenzo Danjo, Kizu; Atsushi Kinoshita, Osaka, all of Japan

[73] Assignee: Sansha Electric Manufacturing Co., Ltd., Osaka, Japan

[21] Appl. No.: 285,002

[22] Filed: Aug. 2, 1994

[30] Foreign Application Priority Data

Oct. 25, 1993 [JP] Japan .................................... 5-288679

[51] Int. Cl.⁶ .................................................. B23K 9/095
[52] U.S. Cl. ................... 219/130.32; 219/130.33
[58] Field of Search ........................ 219/130.31, 130.32, 219/130.33, 137 PS

[56] References Cited

U.S. PATENT DOCUMENTS 3,792,225  2/1974  Needham et al. ................. 219/130.21
4,349,720  9/1982  Makimaa ............................ 219/130.33
5,272,314  12/1993  Moriguchi et al. .
5,306,894  4/1994  Moriguchi et al. .

Primary Examiner—Clifford C. Shaw
Attorney, Agent, or Firm—Banner & Allegretti, Ltd.

[57] ABSTRACT

An inverter controlled DC arc welder of consumable electrode type includes an input rectifier for rectifying AC input power, an inverter for converting the rectifier output to high frequency AC power, an output transformer for stepping down the inverter output voltage, and an output rectifier for rectifying the transformer output voltage to provide a DC output voltage to be applied to a welder load. The welder further includes means for detecting current flowing through the welder load to produce a detection signal, a differentiator circuit for differentiating the detection signal, and correction means for correcting a predetermined reference voltage in accordance with the differentiator output voltage. Feedback control means controls the inverter in accordance with the difference between the transformer output and the corrected reference voltage.

7 Claims, 4 Drawing Sheets

CONSUMABLE ELECTRODE DC ARC WELDER

This invention relates to a consumable electrode D.C. arc welder and, especially, to an inverter controlled D.C. arc welder of consumable electrode type.

BACKGROUND OF THE INVENTION

An inverter controlled DC arc welder is arranged to rectify AC power from a commercial power supply by an input rectifier, convert its DC output into high frequency AC power by an inverter composed of semiconductor switching elements, suitably reduce its voltage by an output transformer and again rectify it to obtain DC power for welding. The welder of this type has such advantages that the device can be made small in size and weight since it needs no input transformer of heavy weight, that the output transformer can be minimized by using an inverter providing a high frequency output, and that the output voltage of the welder can be stabilized effectively by controlling the switching operation of the inverter with a control voltage which can be derived from the difference between the output voltage of the welder and a predetermined reference voltage.

DC arc welding of consumable electrode type, such as $CO_2$ welding, MAG welding and MIG welding, is effected by supplying such stabilized DC power as described above from a welder to a welding load formed of a continuously fed welding electrode rod and a base material to be welded. The welding electrode rod is brought into contact with or shorted to the base material and, then, separated from the base material to thereby form an arc therebetween. This shorting and separating operation is repeated. However, undesirable spattering may take place if a current supplied to the welding load becomes excessive when the electrode rod is shorted to the base material. In order to avoid such spattering, it has been a general practice to provide a large DC reactor in the output side of the welder which prevents rapid increase of the load current. However, the use of such a large DC reactor is a bar to reduction of the size and weight of the welder.

Means for preventing such undesirable spattering has been already proposed by people including some of the inventors of the present application in U.S. Pat. No. 5,306,894 and U.S. Pat. No. 5,272,314. According to U.S. Pat. No. 5,306,894, it is arranged that the periods of above-mentioned shorting and arcing are detected from a voltage between output terminals of the welder and the above-mentioned reference voltage is reduced by a predetermined amount during the shorting period to thereby prevent spattering. The reference voltage is raised by a predetermined amount during at least an early part of the arcing period to thereby prevent insufficient welding which would result from the above-mentioned reference voltage reduction.

According to U.S. Pat. No. 5,272,314, feedback control means is provided to detect the difference between the welder output voltage and a predetermined reference voltage. The inverter is controlled in accordance with the detected voltage difference to maintain the average output of the welder constant. At the same time, DC output current of the welder is detected, and the detected signal is differentiated. During a period in which the differentiated version of the detected signal is positive, or, in other words, during a shorting period, the reference voltage is lowered by a predetermined value so that the average output voltage becomes lower during the shorting period.

However, in the system of either one of the above-reference U.S. patents, the amount of correction to the reference voltage is always fixed and cannot follow unexpected change of welding load condition. More particularly, since the correction value is insensitive to unexpected changes in welding, such as movement of the welding electrode rod caused by improper handling by an operator and change in shape of portions to be welded, undesirable spattering may still happen. Especially, the system of U.S. Pat. No. 5,306,894 has such a problem that it cannot respond rapidly to changes in thickness of the base material, and, therefore, it is liable to cause blowout when thin plates are welded and insufficient weld when thick plates are welded.

Accordingly, an object of this invention is to provide an improved consumable electrode DC arc welder which can rapidly respond to any unexpected changes in load condition, for effectively preventing spattering and also avoiding blowout and insufficient welding.

SUMMARY OF THE INVENTION

A consumable electrode DC arc welder includes an input rectifier for rectifying AC input power, an inverter for converting the output of the rectifier into high frequency AC power, an output transformer suitably stepping down the output voltage of the inverter, an output rectifier for rectifying the output of the output transformer, and feedback control means for controlling the inverter in accordance with the difference between the output voltage of the output transformer and a reference voltage.

According to this invention, the welder further comprises means for detecting current flowing through a welding load to provide a corresponding detection signal, a differentiator circuit for differentiating the detection signal, and correction means for subtracting the output voltage of the differentiator circuit from the reference voltage.

The above-described and other features and functions of this invention will be described in more detail below in conjunction with its preferred embodiments with reference to the accompanying drawings.

BRIEF DESCRIPTION OF THE DRAWINGS

In the drawings.

Throughout the drawings, the same reference numerals are given to corresponding circuit components.

DESCRIPTION OF PREFERRED EMBODIMENTS

Figure 1:
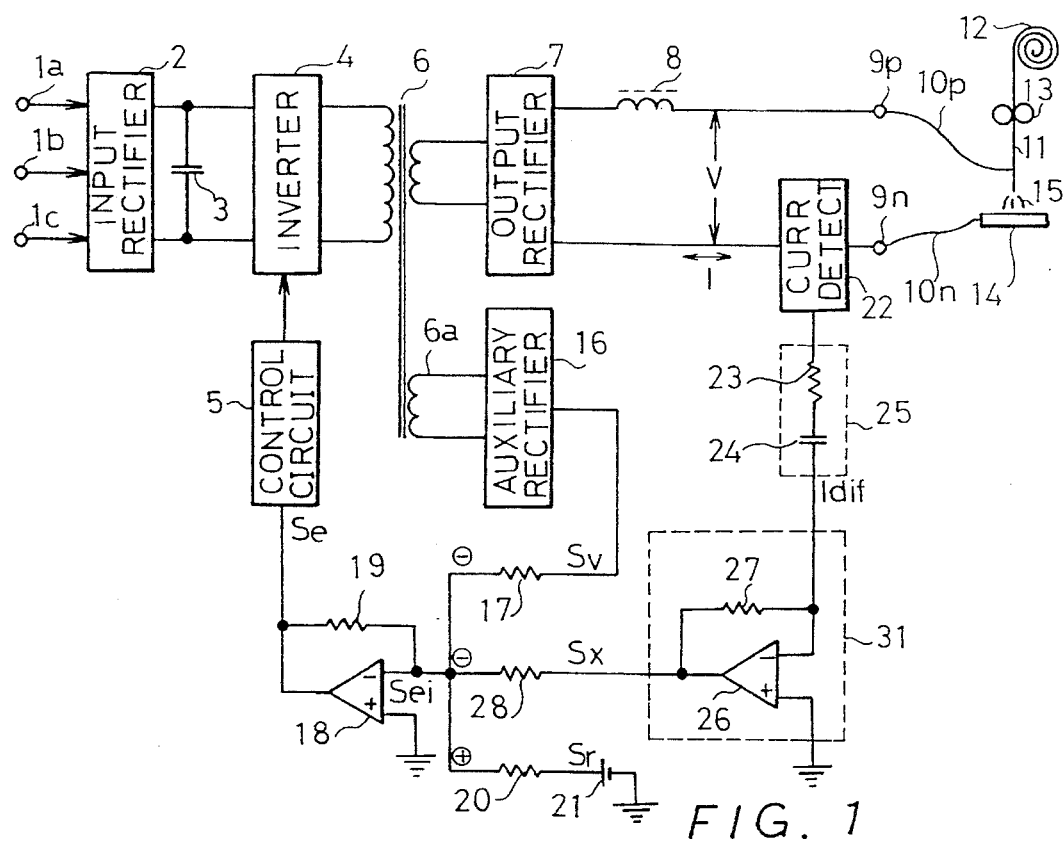
FIG. 1 is a schematic circuit diagram showing a consumable electrode DC are welder according to one embodiment of this invention.

Referring to FIG. 1, AC power supplied to input terminals 1a, 1b and 1c from a commercial three-phase AC power supply of 200 volts, for example, is rectified by an input rectifier 2 of diode-bridge configuration, for example, smoothed by a smoothing capacitor 3 and then supplied to an inverter 4. The inverter 4 may be composed of a bridge circuit of semiconductor switching elements, such as transistors, as is known. The inverter 4 is controlled by an inverter control circuit 5 to achieve switching at a high frequency to thereby produce high frequency AC power. The high frequency power is suitably lowered in voltage by an output transformer 6 and rectified by an output rectifier 7 of diode-bridge configuration, for example. The rectified output is supplied through a smoothing and current-limiting DC reactor 8 to appear across positive and negative output terminals 9p and 9n. The positive output terminal 9p is connected through an insulated cable 10p to an electrode rod 11 which is continuously fed from a hoop 12 by means of a feeding mechanism 13. The negative output terminal 9n is connected through an insulated cable 10n to a base material 14 to be welded. The electrode rod 11 and the base material 14 form a welding load 15 between which an arc is generated.

Figure 2:
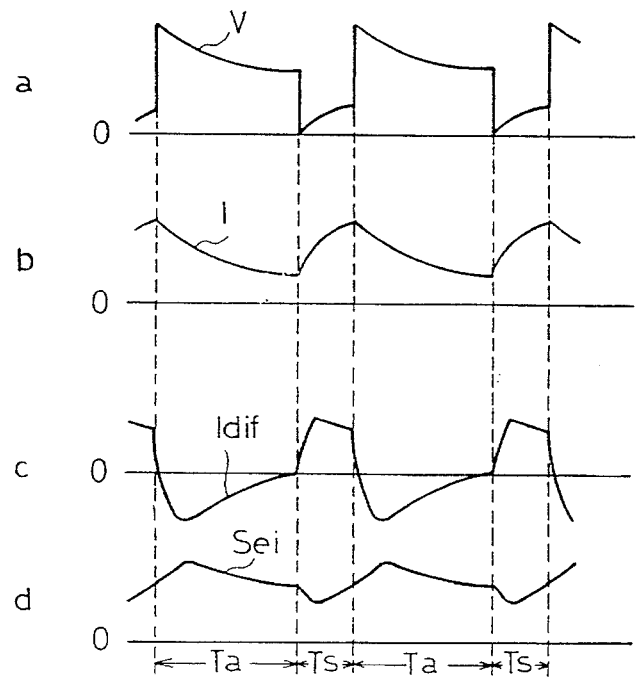
FIG. 2(a)–2(d) show signal waveforms at various portions of the circuit in the embodiment shown in FIG. 1.

During welding operation, the voltage V between the output terminals 9p and 9n and the current I flowing through the welding load 15 vary as shown in FIG. 2, waveforms a and b, respectively. In FIG. 2, Ta and Ts denote arcing and shorting periods, respectively.

The output transformer 6 has a tertiary winding 6a, and the output voltage across the winding 6a is rectified by an auxiliary rectifier 16. The output of the rectifier 16 is a negative auxiliary signal S, and is applied through an output resistor 17 to an inverting input terminal of an operational amplifier 18 having its noninverting input terminal grounded. A feedback resistor 19 is connected between the output and inverting input terminals of the operational amplifier 18. It should be noted that although it is desirable to detect the voltage variations between the output terminals 9p and 9n, in order to correct the welder output voltage, the difference between the output voltage during shorting period and the output voltage during arcing periods is too large to process it into a form useable for the desired control. This is the reason why the voltage across the tertiary winding 6a which has smaller variations than the output voltage between the output terminals is used.

A positive reference voltage $S_r$ is supplied through a resistor 20 to the inverting input terminal of the operational amplifier 18 from a reference voltage source 21, such as a battery.

The welding load current I is detected by a current detector 22. The detector output is differentiated by a differentiator circuit 25 composed of a series circuit of a resistor 23 and a capacitor 24. As shown in FIG. 2 waveform c, the output $I_{dif}$ of the differentiator circuit 25 rises abruptly immediately after the shorting period starts and drops gradually thereafter. The output $I_{dif}$ drops abruptly in the early part of the arcing period and recovers gradually thereafter. The differentiated output $I_{dif}$ is processed by an operational amplifier 26 accompanied by a feedback resistor 27, and a negative correction signal $S_x$ is developed at the output of the operational amplifier 26. The negative correction signal $S_x$ is supplied through a resistor 28 to the inverting input terminal of the operational amplifier 18. Accordingly, the input $S_{ei}$ at the inverting input terminal of the operational amplifier 18 has a value equal to $S_r$-$S_v$-$S_x$, and a corresponding output is supplied as an error signal $S_e$ to the inverter control circuit 5. The inverter control circuit 5 controls the output of the inverter and, hence, the output of the welder in a sense to cancel the signal $S_e$ so as to stabilize the welder output.

The input $S_{ei}$ at the inverting input terminal of the operational amplifier 18 has a level abruptly decreasing immediately after the shorting period starts and recovering gradually thereafter, as shown in FIG. 2, waveform d. The differentiator output $I_{dif}$ becomes higher and the level of the correction signal $S_x$ becomes lower accordingly as the rate of increase of the welder output current I increases, which causes the level of the input $S_{ei}$ to decrease, too, so that the output voltage and current of the welder decrease to suppress the occurrence of spattering. Further, the input $S_{ei}$ at the inverting input terminal of the operational amplifier 18 rises in an early part of the arcing period and drops gradually thereafter as shown.

Figure 3:
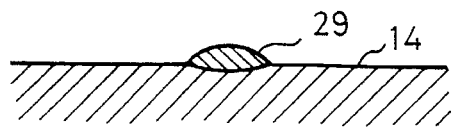
FIG. 3 is a sectional view of a welded portion showing a preferable state of weld.

On the other hand, the differentiator output $I_{dif}$ becomes smaller and the correction signal $S_x$ rises its level when the rate of decrease of the output current is large when, for example, the base material is a thick plate. In such a case, the output voltage and current of the welder increase to enhance the heat supplied to the welding load so that a broad and strong weld 29 as shown in FIG. 3 is obtained. Conversely, when the base material is a thin plate, the output current decrease is small and the differentiated output $I_{dif}$ is also small. Accordingly, the output current is suppressed to prevent blowout of the base material.

Figure 4:
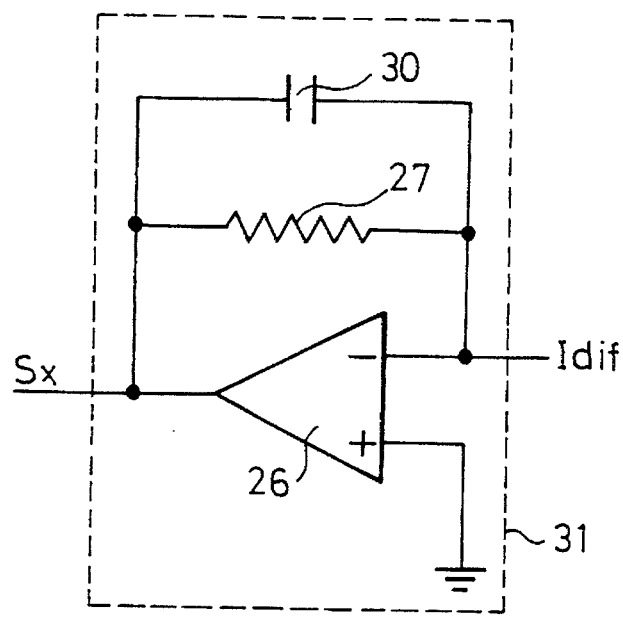
FIG. 4 is a schematic circuit diagram of a portion of a consumable electrode DC are welder according to another embodiment of this invention.

As shown in FIG. 4, a capacitor 30 may be connected in parallel with the feedback resistor 27 so that the capacitor 30, the feedback resistor 27 and the operational amplifier 26 form an integrator circuit 31. With this arrangement, variations of the output $I_{dif}$ of the differentiator circuit 25 are suppressed by the integrator circuit 31 so that variations of the correction output signal $S_x$ are also reduced. In consequence, fluctuations of the error signal $S_e$ are also reduced accordingly so that the constant voltage control can be improved. The integrator circuit 31 is especially useful when molten drops of the electrode rod 11 during welding are transferred to the base material 14 in a spray form or globular form.

When the welder output current is small, the electrode rod 11 may be fused to the base material 14 so that the shorting state is maintained and, therefore, the welder cannot switch into an arcing condition.

Figure 5:
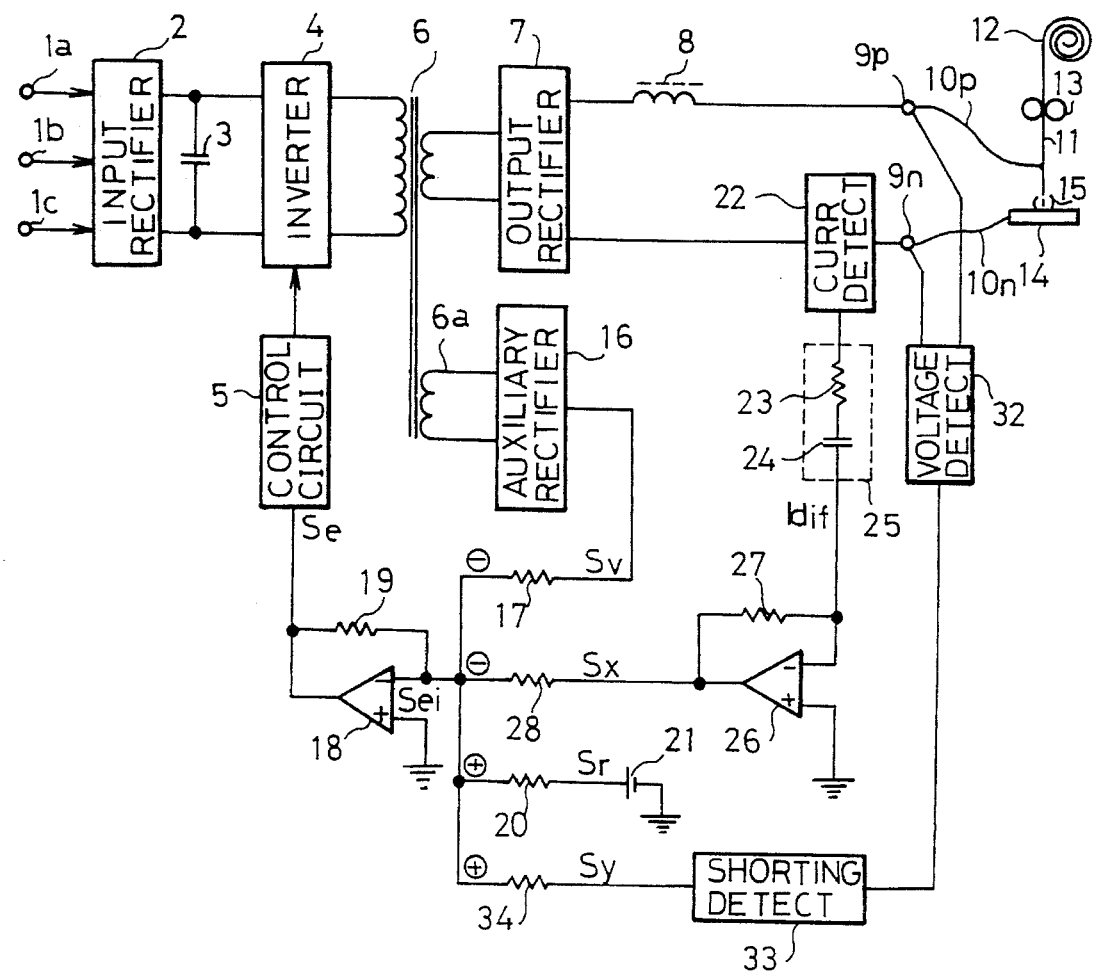
FIG. 5 is a schematic circuit diagram showing a consumable electrode DC are welder according to still another embodiment of this invention.

An embodiment shown in FIG. 5 is to solve this problem. This embodiment is a modification of the embodiment shown in FIG. 1. It differs from the latter in that an output voltage detector 32 is connected between the output terminals 9p and 9n and the detector output is coupled through a shorting detector 33 and a resistor 34 to the inverting input terminal of the operational amplifier 18. The shorting detector 33 detects a shorting state of the welding load based on the output of the voltage detector 32 and produces a positive shorting release signal $S_y$ when a predetermined length of the shorting period has passed. In this embodiment, therefore, a signal voltage $S_r$-$S_v$-$S_x$+$S_y$ is applied to the inverting input terminal of the operational amplifier 18. Thus, the welder output current exhibits an increase corresponding to the voltage $S_y$ to thereby force the electrode rod 11 to melt and separated from the base material 14 so that welder is rapidly released from the shorting condition.

Although, in the above-described embodiments, the welding current correction is achieved without the diameter and properties of the welding electrode rod and the type of shield gas taken into account, it is preferable in practice that the amount of correction to be provided to the welding current is variable in accordance with such parameters. Further, in the above-described embodiments, the amount of correction provided to the welding current is fixed during the arcing operation, but it is preferable for the amount of correction to be variable so as to enable adjustment of heat to be supplied to the welding load.

Figure 6:
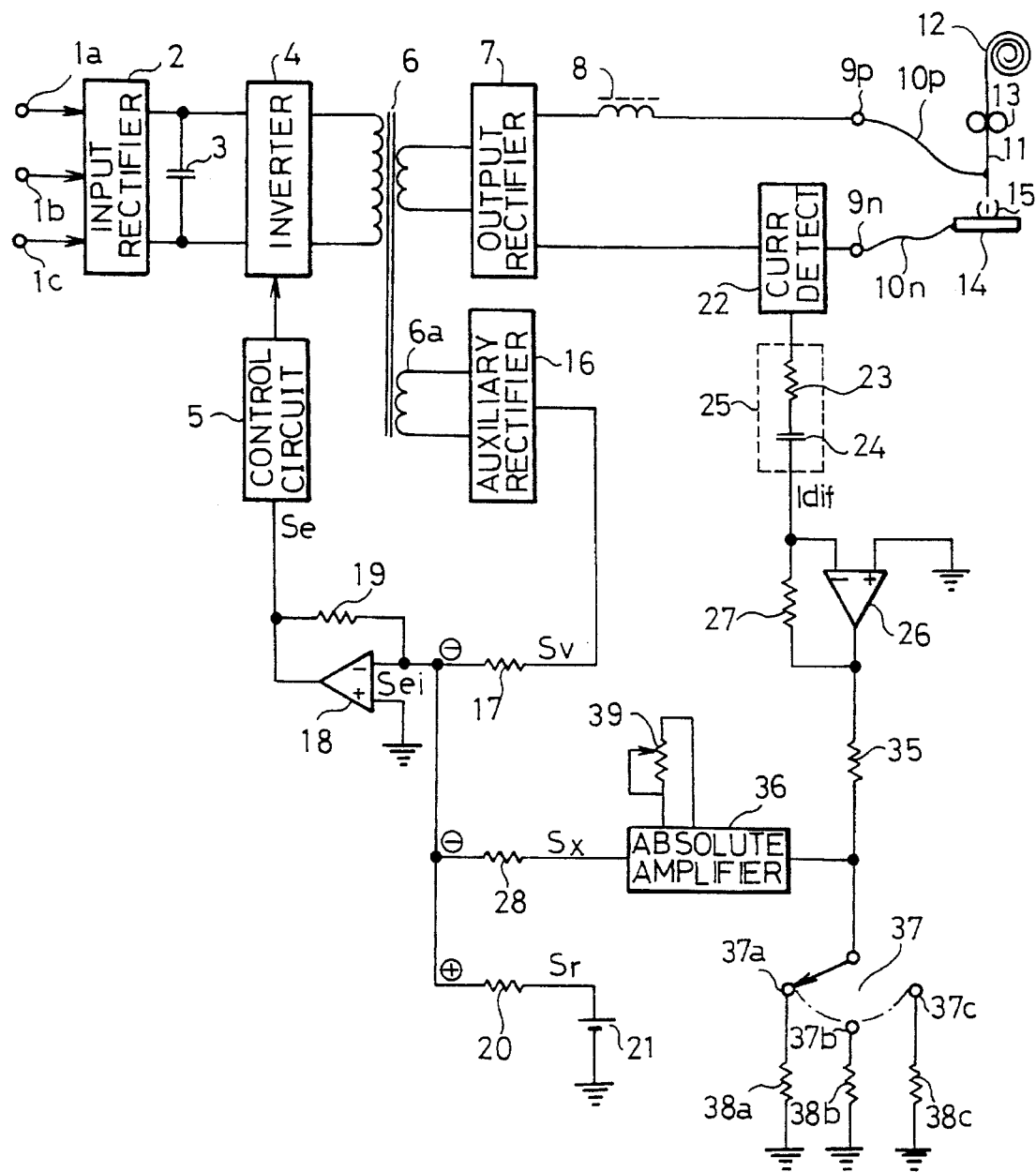
FIG. 6 is a schematic circuit diagram showing a consumable electrode DC are welder according to a further embodiment of this invention.

An embodiment shown in FIG. 6 provides a variable amount of correction to the welding current. This embodiment is also a modification of the embodiment shown in FIG. 1. It differs from the embodiment shown in FIG. 1 in that a resistor 35 and an "absolute" amplifier 36 are connected between the output of operational amplifier 26 and the resistor 28. The welder of FIG. 6 differs from that of FIG. 1 further in that the input terminal of the "absolute" amplifier 36 is connected to a level selector switch 37. The switch 37 has fixed contacts 37a, 37b and 37c connected respectively to resistors 38a, 38b and 38c which are grounded to constitute voltage dividers, and is used to provide a desired level for the output $I_{dif}$ of the differentiator circuit 25 so that the level of the correction signal $S_x$ as a whole can be made to correspond to the diameter and type of the electrode rod used and to the shield gas used.

Figure 7:
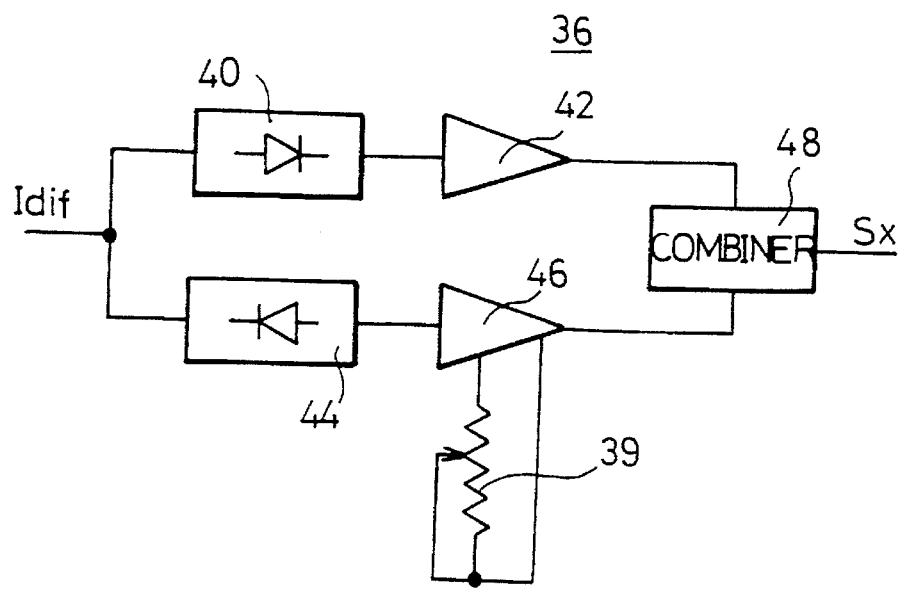
FIG. 7 is a block circuit diagram showing an absolute amplifier used in the arrangement shown in FIG. 6.

FIG. 7 shows one example of an "absolute" amplifier. As shown in FIG. 7, in the "absolute" amplifier 36, the positive polarity portion of the differentiator output $I_{dif}$ from the differentiator circuit 25 is detected by a rectifier circuit 40 without being subjected to polarity inversion. The detection output of the rectifier circuit 40 is amplified by a noninverting amplifier 42 having a fixed gain. The negative polarity portion of the differentiator output $I_{dif}$ is detected by a rectifier circuit 44 without being subjected to polarity inversion, and the output of the rectifier circuit 44 is amplified by a noninverting amplifier 46. The gain of the amplifier 46 is adjustable by means of a gain adjuster 39. The outputs from the respective amplifiers 42 and 46 are combined in a combiner 48, which results in the correction signal $S_x$. Thus, according to the embodiment shown in FIG. 6, only the negative polarity portion of the differentiator output $I_{dif}$ can be selectively altered by adjusting the setting of the gain adjuster 39. This enables the adjustment of the level of the correction signal $S_x$ during the arcing period and, consequently, the level of heat to be supplied to the welding load can be adjusted. The selector switch 37 can be omitted if there is no special demand.

The above-described embodiments are presented only for the purpose of illustration, and the present invention is not limited to them. It should be obvious to those skilled in the art that various modifications and changes can be made to the embodiments without departing the spirit and scope of the invention as defined in the appended claims.

What is claimed is:

1. A consumable electrode DC arc welder comprising:

an input rectifier for rectifying AC input power;

an inverter for converting an output of said input rectifier to high frequency AC power;

an output transformer for stepping down an output voltage of said inverter;

an output rectifier for rectifying an output voltage of said transformer to provide a DC output voltage to be applied to a welding load; and feedback control means for controlling said inverter in accordance with a difference between the output voltage of said transformer and a predetermined reference voltage;

wherein said welder further comprises:

means for detecting a current flowing through said welding load to provide a detection signal;

a differentiator circuit for differentiating said detection signal;

a plurality of voltage dividers connected to the output of said differentiator circuit, and a switch for selecting said voltage dividers to derive a divided output voltage; and first correction means for subtracting said derived, divided output voltage from said reference voltage.

2. The consumable electrode DC arc welder as set forth in claim 1 wherein an absolute amplifier for adjusting a negative level of the output of said differentiator circuit is connected between said differentiator circuit and said first correction means.

3. The consumable electrode DC arc welder as set forth in claim 1 wherein said welder further comprises means for detecting shorting of said welding load and providing a shorting release signal after a predetermined time, and second correction means for adding said shorting release signal to said reference voltage.

4. A consumable electrode DC arc welder comprising:

an input rectifier for rectifying AC input power;

an inverter for converting an output of said input rectifier to high frequency AC power;

an output transformer for stepping down an output voltage of said inverter;

an output rectifier for rectifying an output voltage of said transformer to provide a DC output voltage to be applied to a welding load; and feedback control means for controlling said inverter in accordance with a difference between the output voltage of said transformer and a predetermined reference voltage;

wherein said welder further comprises:

means for detecting a current flowing through said welding load to provide a detection signal;

a differentiator circuit for differentiating said detection signal;

an absolute amplifier connected between the output of said differentiator circuit and said first correction means for adjusting a negative level of the output of said differentiator circuit.

5. A consumable electrode DC arc welder as set forth in claim 4 wherein said welder further comprises means for detecting shorting of said welding load and providing a shorting release signal after a predetermined time, and second correction means for adding said shorting release signal to said reference voltage.

6. A consumable electrode DC arc welder as set forth in claim 5 wherein said absolute amplifier comprises first rectifying means for rectifying a positive component of the output signal of said differentiator circuit, second rectifying means for rectifying a negative component of the output signal of said differentiator circuit, variable gain amplifying means having gain adjusting means, for amplifying an output signal of said second rectifying means, and combining means for combining an output signal of said variable gain amplifying means with an output signal of said first rectifying means.

7. A consumable electrode DC arc welder as set forth in claim 4 wherein said absolute amplifier comprises first rectifying means for rectifying a positive component of the output signal of said differentiator circuit, second rectifying means for rectifying a negative component of the output signal of said differentiator circuit, variable gain amplifying means having gain adjusting means, for amplifying an output signal of said second rectifying means, and combining means for combining an output signal of said variable gain amplifying means with an output signal of said first rectifying means.

* * * * *